Patented Jan. 5, 1954

2,665,294

UNITED STATES PATENT OFFICE 2,665,294

THIOAMYL ESTER OF DIPHENYLDI-THIOPHOSPHINIC ACID AND PROCESS THEREFOR

Gennady M. Kosolapoff, Auburn, Ala., assignor to Monsanto Chemical Company, St. Louis, Mo., a corporation of Delaware No Drawing. Application March 12, 1952, Serial No. 276,230

2 Claims. (Cl. 260—461)

This invention relates to new phosphorus organic compounds with sulfur. An object of the invention is to provide new and useful compositions containing phosphorus and sulfur and having utility as adjuvants for lubricants.

It is desirable in the compounding of lubricants such as hydrocarbon oils to introduce phosphorus and sulfur in such chemical products. Variations in the substituents enable different functions such as pour point depression and extreme pressure lubricity to be accomplished in the modification of oils and greases. For example, it is desirable to provide phosphorus in an agent intended as a lubricating oil modifier. U. S. Patent 2,190,715 discloses alkylbenzene cloro-phosphines in an extreme pressure lubricant, but it has been found that products which have the chlorine bound directly to phosphorus will hydrolyze readily. Hence, such compounds will release hydrochloric acid, the corrosive nature of which is well known. Materials of the present invention avoid such a tendency by utilizing phosphorus derivatives in which the tendency to hydrolyze is decreased by avoiding a direct phosphorus-chlorine bonding.

Other objects and advantages of the invention will be apparent from the following description.

The process of obtaining the present compositions makes use of the Friedel-Crafts reaction first to obtain a poly-substituted phosphorus compound. The general procedure consists of reacting an organic compound characterized by the presence of an alkyl or aromatic nucleus, or thiophene, any of which may be halogenated, with phosphorus trichloride catalyzed by aluminum chloride:

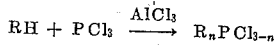

where $n$ is one or two and R is an alkyl, aryl or heterocyclic radical.

The above reaction product which exists to a considerable degree as a complex with aluminum chloride is then treated in a suitable solvent with gaseous chlorine to decompose the complex. The phosphorus is also raised to the pentavalent state to provide for the introduction of sulfur into the molecule. The substituted phosphorus compound as obtained in solution is then reacted with a mercaptan. I may use any mercaptan which will esterify the phosphorus compound; representative members are methyl, ethyl, n-propyl, isopropyl, n-butyl, isobutyl, sec-butyl, tert.-butyl, n-amyl, n-hexyl, cyclohexyl, n-octyl, capryl, n-decyl, lauryl, myristyl, ctyl, stearyl and benzyl mercaptans. This stage of the process may be represented by the equation

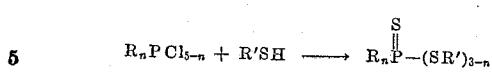

where $n$ is an integer less than three, that is, one or two, R is an alkylaryl or heterocyclic radical, and R' is an alkyl or aryl radical.

The names generally assigned to phosphorus compounds of this type are:

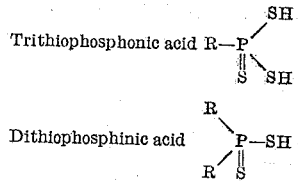

This invention contemplates principally the thioesters of these compounds where R is an alkyl, aryl or thienyl radical which may be further substituted.

The alkali and alkaline earth salts of the esters may be formed by conventional means such as saponification to give the metal thio salts and oxy salts which in combination are sometimes referred to as mono-, di- and tri-thiophosphonic and mono-, and di-thiophosphinic compounds, respectively.

In order that the invention may be clearly understood and readily carried into effect, a practical method of carrying out the process according to the invention will now be described in greater detail by way of example.

Preparation of thioamyl esters of benzene trithiophosphonic acid and diphenyldithiophosphinic acid: I used 39 parts of benzine, 205 parts of phosphorus trichloride and 34 parts of aluminum chloride which were refluxed for 36 hours. After removal of volatile matter by vacuum at 50° C. the residual material was taken up in dry tetrachlorethane and chlorinated with stirring and ice-cooling until chlorine began to escape. The charge was blown with air for 20 minutes and was then treated with stirring and ice-cooling under vacuum with 250 parts of amyl mercaptan. After standing for 48 hours the charge was washed with ice water in dilute hydrochloric acid until freed of aluminum salts and was then freed of solvent under vacuum. The intermediate product so obtained was a dark brown liquid composed of a mixture of thioamyl esters of benzenetrithiophosphonic acid and diphenyldithiophosphinic acid. This intermediate product was distilled under vacuum to give an overhead of the thioamyl ester of benzenetrithiophosphonic acid having the structural formula,

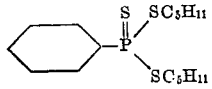

as a light brown liquid of moderate viscosity. The bottoms portion was the thioamyl ester of diphenyldithiophosphinic acid having the structural formula

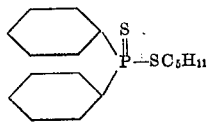

obtained as a dark brown viscous liquid. The individual esters are water-insoluble, but readily soluble in hydrocarbon lubricating oils. When thus employed in lubricating oils such as in the proportion of from 0.01% to 5% it was found that an improvement in pour point depression and in extreme pressure lubricity was obtained.

In lubricant compounding, such as with hydrocarbon oils to get particular modifying properties not otherwise obtainable in lubricating oils and greases, it is desirable to employ the present compositions per se or compositions of metal salts prepared from the above compounds, such as in concentrations of from 0.01% to 5.0%, depending upon the particular compound. The alkali and alkaline earth salts produced in a conventional manner such as by saponification with an alkali or alkaline earth compound such as sodium hydroxide or calcium hydroxide are particularly valuable in that these compounds are fairly soluble in organic solvents including hydrocarbon lubricating oils, hence it is possible to add fairly large quantities of products here claimed to a lubricant or to a mixture concentrate and still maintain the soluble condition without the precipitation or clouding out of the adjuvant material.

In carrying out the invention I may also react substituted benzenes such as monochlorobenzene, ortho - dichlorobenzene, para - dichlorobenzene, meta-dichlorobenzene, ethylbenzene, butylbenzene and higher alkyl aromatics such as are produced by Friedel-Crafts alkylation with chlorinated kerosene, gas oil lubricating oil fractions and wax reacted with benzene or naphthalene. The corresponding derivatives of thiophene also function in the same relationship. Alkyl compounds reacted with phosphorus compounds may also be utilized. By starting with petroleum products such as distillate or residual fractions of kerosene, lubricating oil or wax reacted with phosphorus trichloride and then processing to make a thioester of such alkyl compounds, I can obtain materials especially compatible with lubricant stocks.

The present application is a continuation-in-part of my copending application Serial No. 673,601, filed May 31, 1946, now abandoned.

What is claimed is:

1. The thioamyl ester of diphenyldithiophosphinic acid.

2. The method of preparing the thioamyl ester of diphenyldithiophosphinic acid which comprises heating benzene with phosphorus trichloride, chlorinating the reaction product therefrom with elemental chlorine, thereafter esterifying with amyl mercaptan to obtain a mixture of the thioamyl ester of benzenedithiophosphonic acid and the thioamyl ester of diphenyldithiophosphinic acid, and distilling off the thioamyl ester of benzenedithiophosphonic acid to obtain the thioamyl ester of diphenyldithiophosphinic acid.

GENNADY M. KOSOLAPOFF.

References Cited in the file of this patent

Arbuzov: J. Russ Phys.-Chem. Soc., vol. 61, pp. 2037–2042 (1929). Cited in Chem. Abst., vol. 24, page 5736.